June 2, 1959  R. D. McCOY ET AL  2,889,508
APPARATUS FOR AUTOMATICALLY POSITIONING A MOVABLE OBJECT
Filed Dec. 4, 1956  8 Sheets-Sheet 1
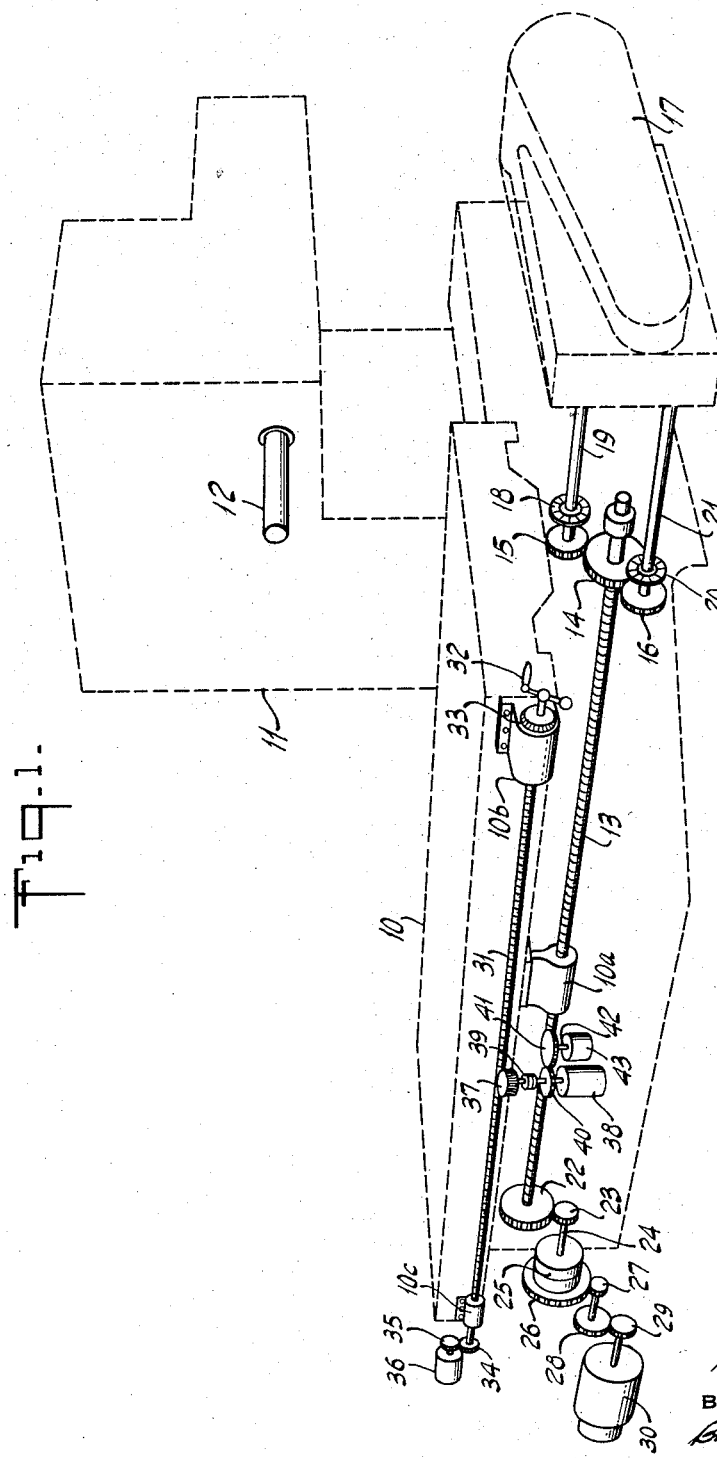
INVENTORS
RAWLEY D. McCOY
SIDNEY GODET
BY
Burgess, Ryan & Hicks
ATTORNEYS

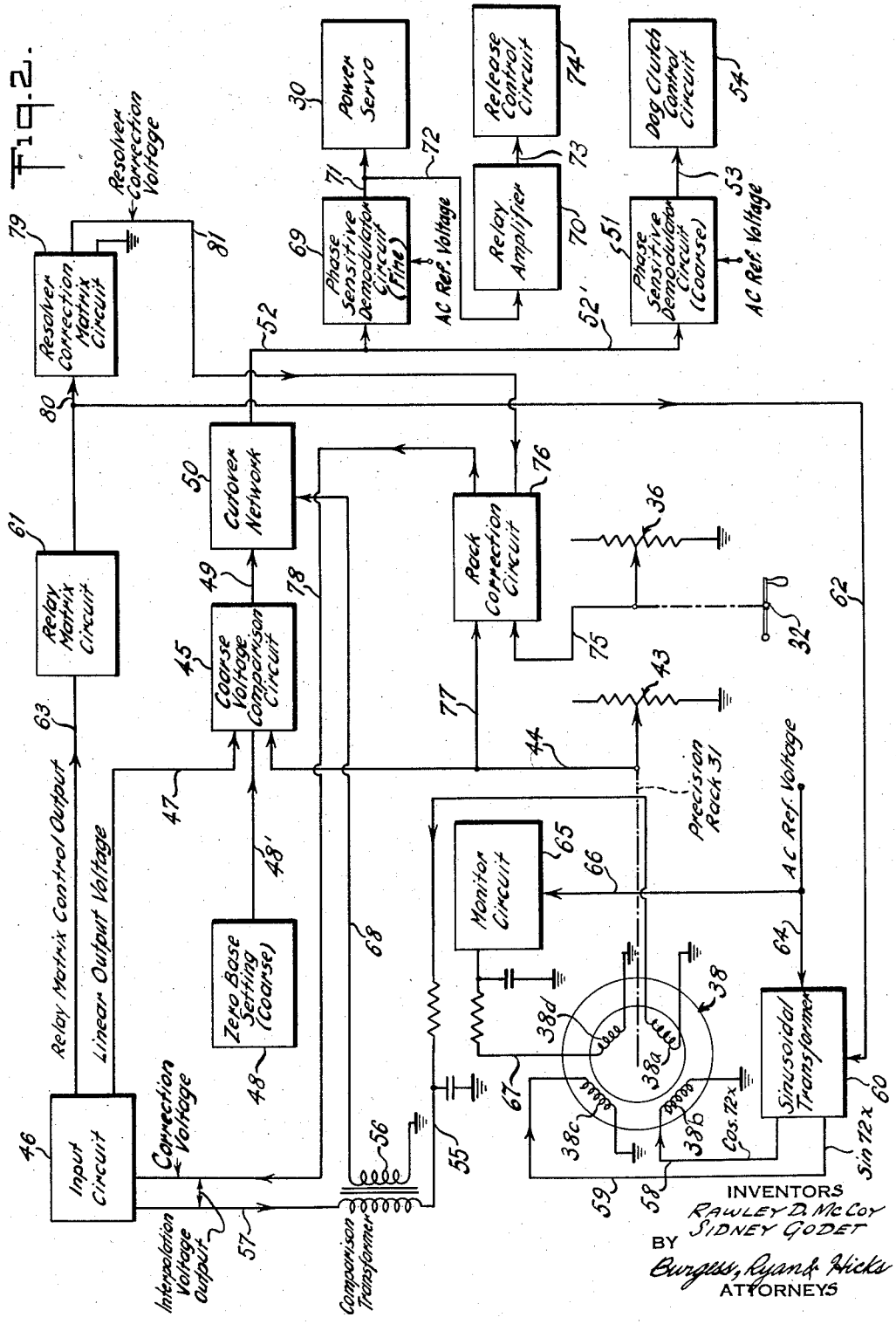

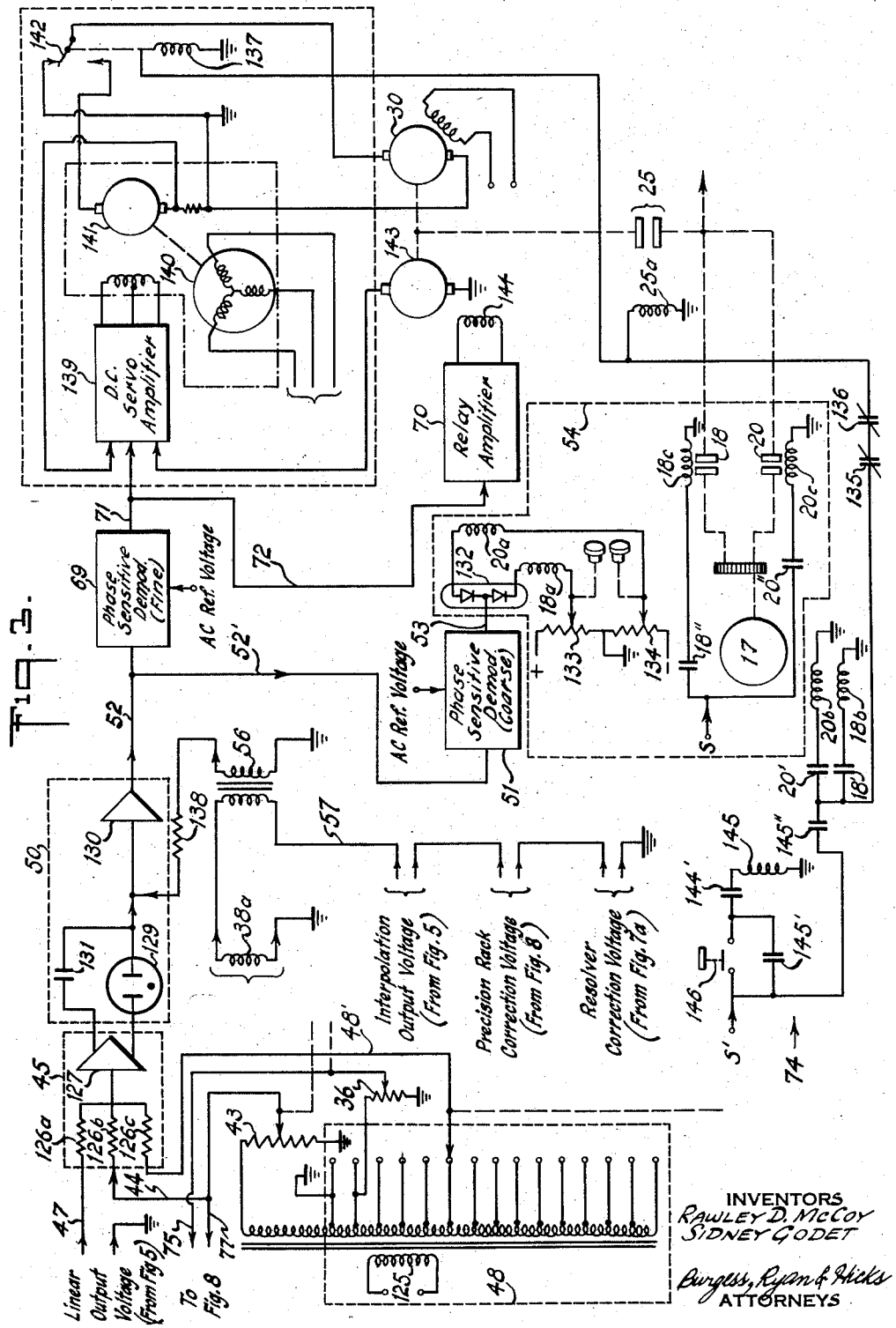

June 2, 1959  R. D. McCOY ET AL  2,889,508
APPARATUS FOR AUTOMATICALLY POSITIONING A MOVABLE OBJECT
Filed Dec. 4, 1956  8 Sheets-Sheet 4
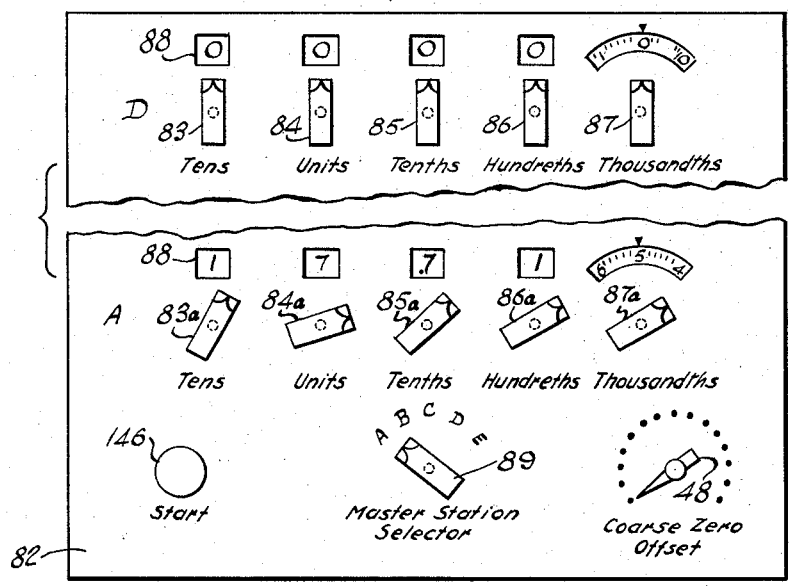
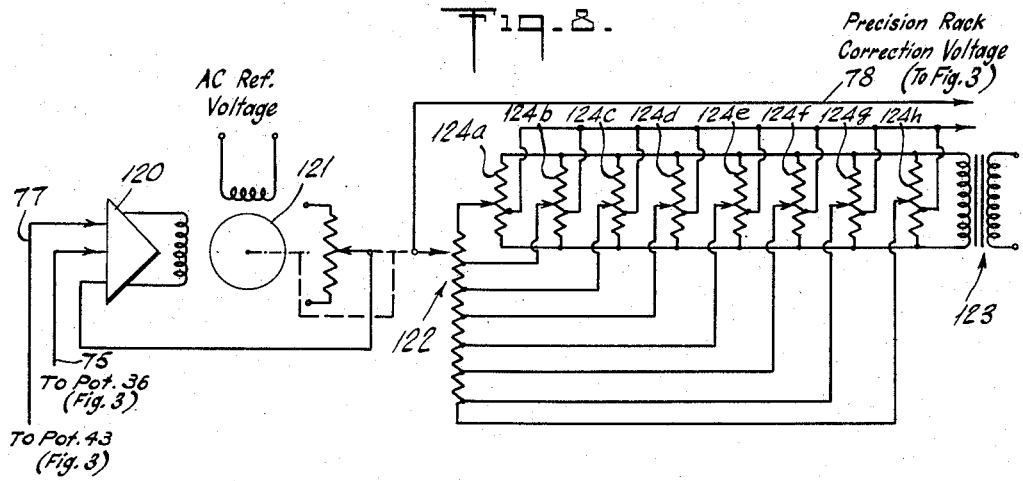
INVENTORS
RAWLEY D. McCOY
BY SIDNEY GODET
Burgess, Ryan & Hicks
ATTORNEYS

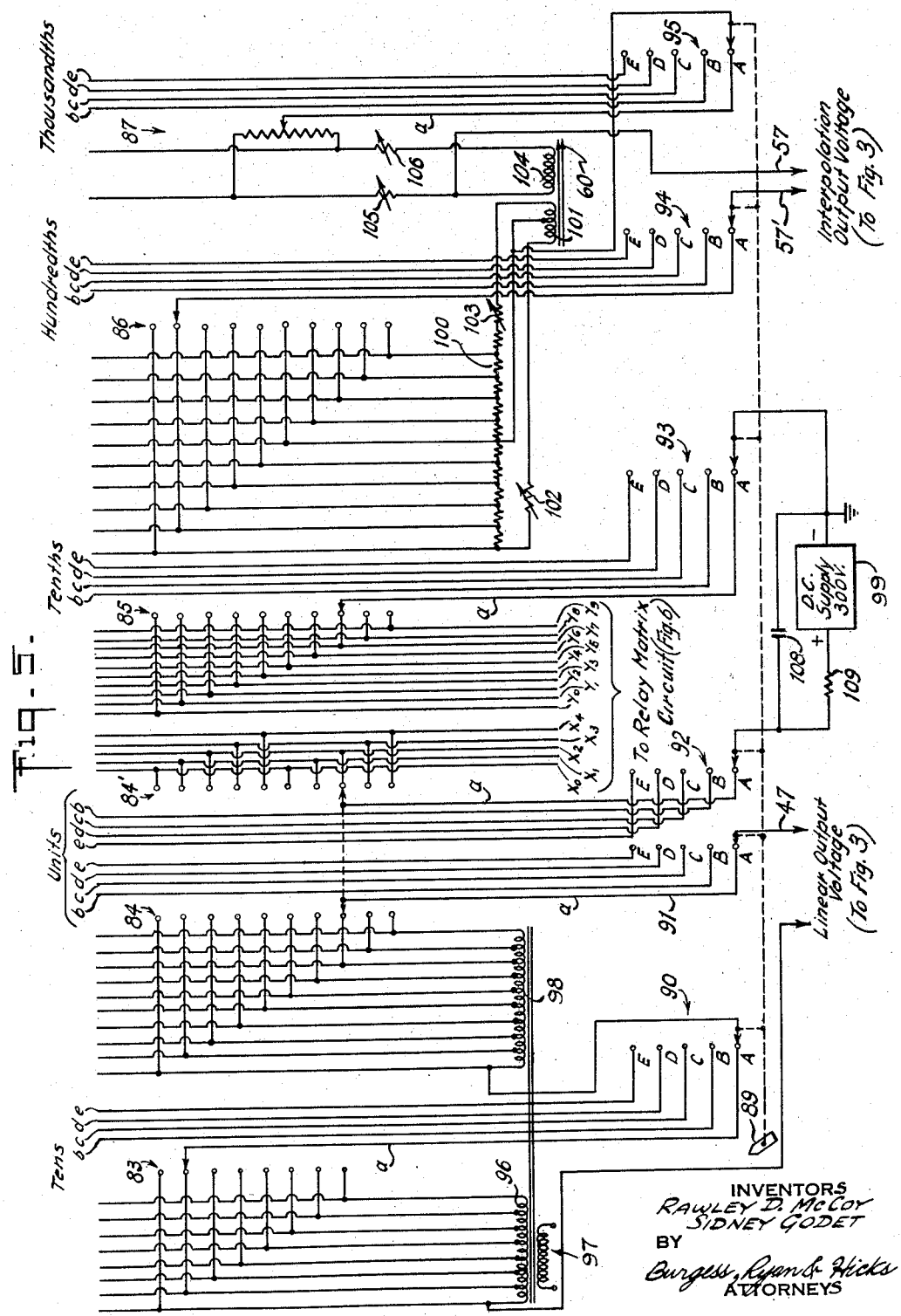

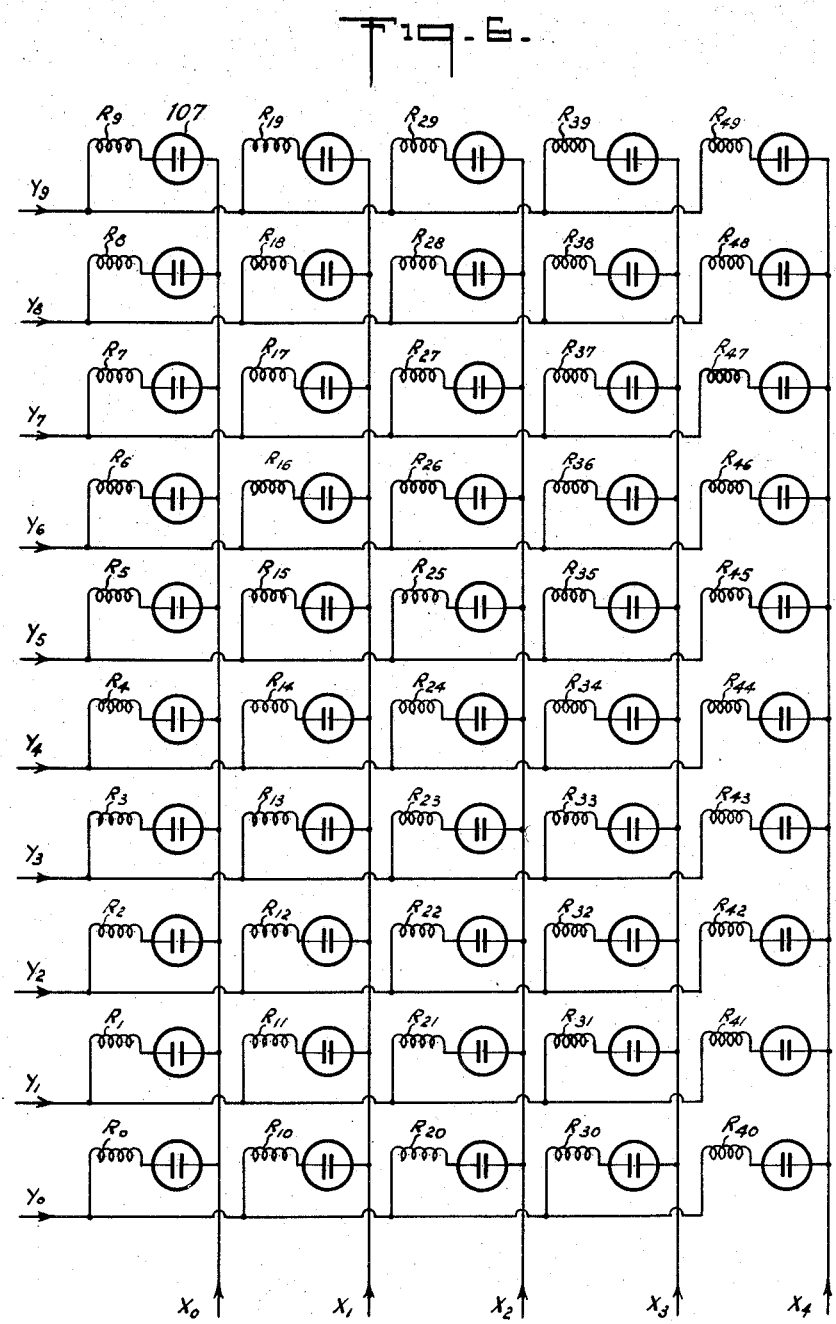

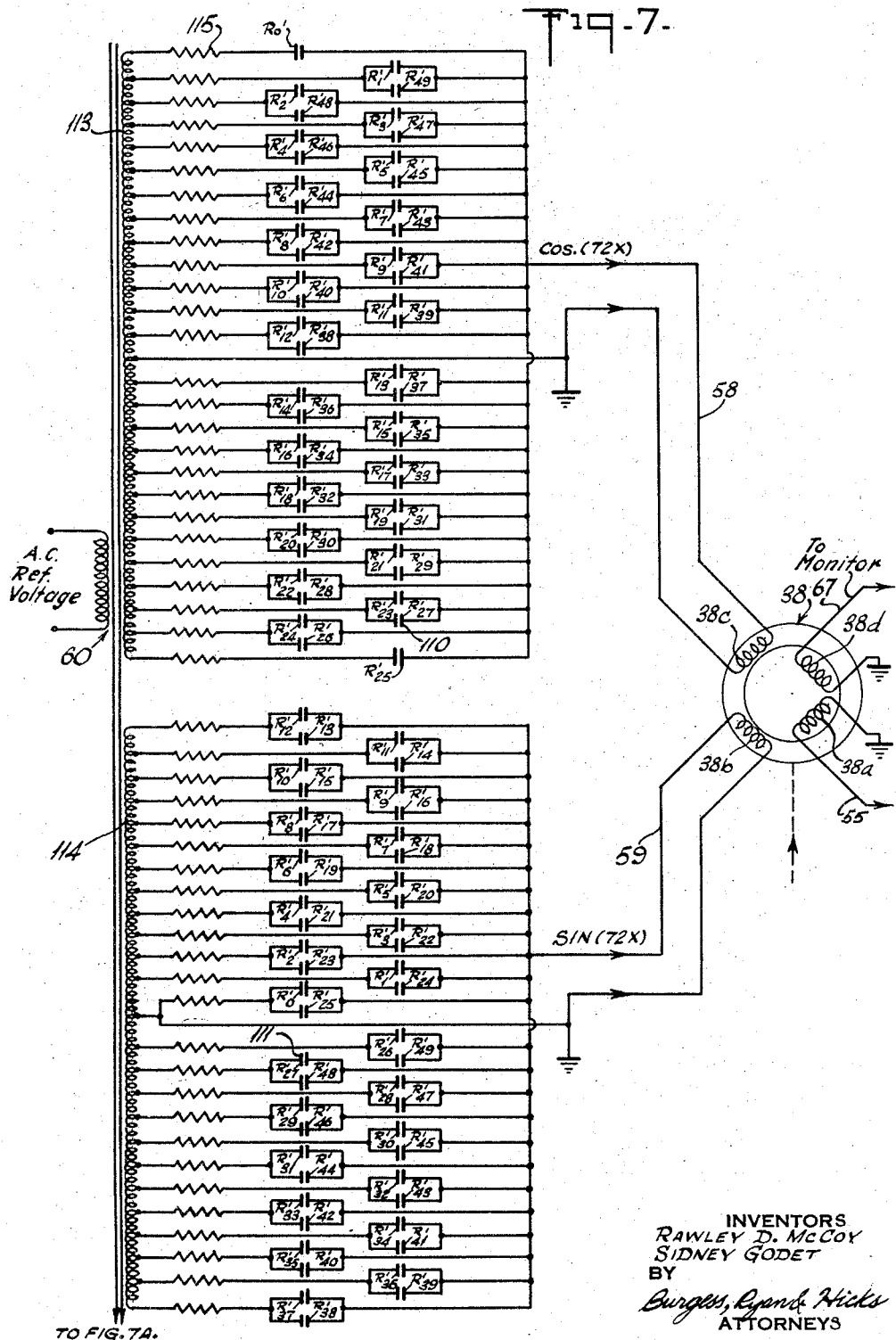

June 2, 1959
R. D. McCOY ET AL
2,889,508
APPARATUS FOR AUTOMATICALLY POSITIONING A MOVABLE OBJECT
Filed Dec. 4, 1956
8 Sheets-Sheet 8
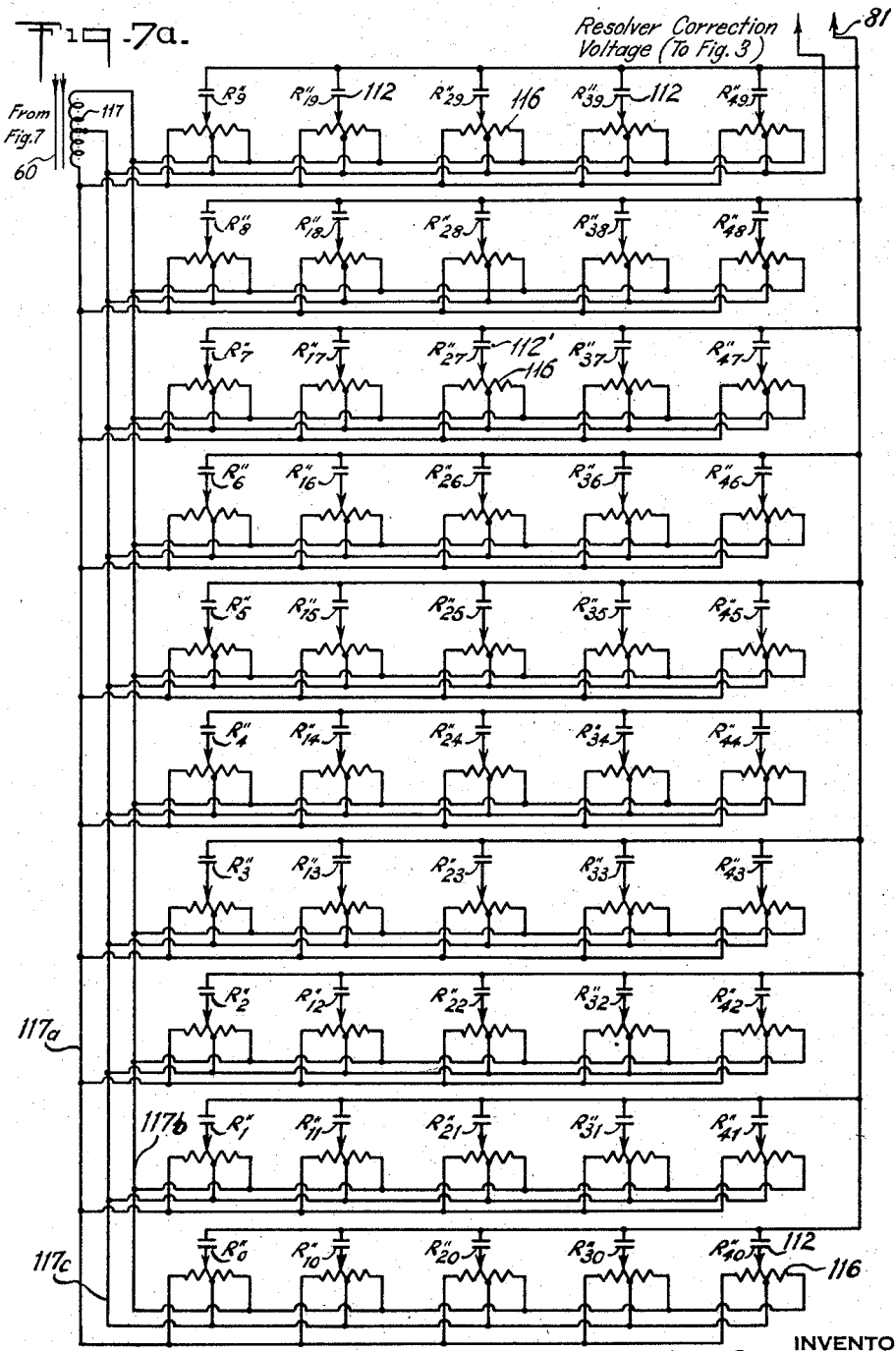
INVENTORS
RAWLEY D. McCOY
SIDNEY GODET
BY
Burgess, Ryan & Hicks
ATTORNEYS

United States Patent Office

2,889,508
Patented June 2, 1959

2,889,508

APPARATUS FOR AUTOMATICALLY POSITIONING A MOVABLE OBJECT

Rawley D. McCoy, Bronxville, and Sidney Godet, Great Neck, N.Y., assignors to Reeves Instrument Corporation, New York, N.Y., a corporation of New York Application December 4, 1956, Serial No. 626,239

21 Claims. (Cl. 318—30)

The present invention relates to apparatus for automatically positioning a movable object and relates, more particularly, to apparatus for automatically positioning the work table of a machine tool in a position for machining operations.

An object of the present invention is to provide apparatus for automatically positioning an object such as a work table of a machine tool accurately and quickly in a selected position for the performance of machining operations or the like. Another object of the invention is to provide apparatus for automatically positioning a work table of a machine tool in accordance with dimensions from a blueprint or the like by means of an electronic control sysetm. A further object of the invention is to provide a control system for automatically positioning a work table or the like which will correct for inaccuracies in mechanical elements of the system.

The apparatus embodying the present invention reduces the time required for setting a work piece in proper position for machining operations and will also reduce inaccuracies due to human errors. In addition, the physical strain on the machine tool operator associated with the exacting task of positioning a work piece with precision is eliminated to a large extent and as a result, the productive capacity of the machine tool is increased with less chance of inaccuracies in the work.

Other objects and advantages of the present invention will be apparent and best understood from the following description and the accompanying drawings in which:

Fig. 1 is a perspective view of a machine tool with attachments for automatically positioning the work table in accordance with the present invention;

Fig. 2 is a block diagram of a control system for automatically positioning the work table shown in Fig. 1;

Fig. 3 is a schematic wiring diagram of a portion of the control system shown in Fig. 2;

Fig. 4 is a front view of an input panel for the control system shown in Fig. 2;

Fig. 5 is a schematic wiring diagram of a portion of the control system shown in Fig. 2; and Figs. 6, 7, 7a, and 8 are schematic wiring diagrams for other portions of the control system shown in Fig. 2.

The invention is illustrated and described herein as applied to a particular form of machine tool, namely, a horizontal boring machine. However, it will be understood that this is merely for purposes of illustration and that the invention may be readily adapted for use with other types of machine tools or for positioning movable objects of various kinds in desired positions as required.

Referring now to the drawings in detail and in particular to Fig. 1, there is a machine tool (shown in broken lines) which has a movable work table 10. The work table is movable laterally with respect to the frame 11 of the machine so that a work piece (not shown) may be brought into proper position for machining operations of a tool carried by a spindle 12 which is rotatably supported by the frame of the machine.

It will be understood that the work table may be movable in other directions with respect to the frame of the machine and that apparatus embodying the present invention may be employed to control such movements. However, to avoid repetition, the present description will deal with only the lateral movement of the table.

The table 10 is slidably mounted on the frame of the machine in the usual manner and has a portion 10a which threadably engages with a feed screw 13. The feed screw 13 is rotatably supported on the frame of the machine in such a way that rotation of the feed screw will move the table laterally with respect to the frame of the machine. The direction in which the table moves will depend upon the direction in which the feed screw is rotated.

The feed screw carries a gear 14 at one end thereof which meshes with gears 15 and 16. The gear 15 is connected to a main drive motor and power gear train, indicated at 17, through a magnetically operated dog-type clutch 18 and a shaft 19. The gear 16 is similarly connected to the main drive motor and power gear train 17 through a magnetically operated dog-type clutch 20 and a shaft 21. The shafts 19 and 21 are driven in opposite directions so that when the clutch 18 is in operation, the table will move in one direction and when the clutch 20 is in operation, the table will move in the opposite direction.

The other end of the feed screw 13 carries a gear 22 which meshes with a gear 23. The gear 23 is carried on a shaft 24 which is connected through a magnetically operated friction clutch 25 and a gear train including gears 26, 27, 28, and 29 to a servo motor 30. Thus, the table may be moved in either direction by the servo motor and the friction clutch 25 when the dog-type clutches are not in operation.

A combination lead screw and rack 31, hereinafter referred to as the precision rack, is threadably mounted in supporting brackets 10b and 10c on the table 10. A crank 32 is connected to one end of the rack and has an indicating dial 33 associated therewith to provide an indication of the setting of the crank. A gear 34 carried at the other end of the precision rack meshes with a gear 35 which is connected to a zero setting potentiometer 36. Thus, by turning the crank 32 and the rack, the setting of the potentiometer may be adjusted as desired to obtain what will be termed a fine zero control voltage.

This arrangement provides a means for changing the position of the work piece carried by the table with respect to the dial settings. The purpose of this is to establish the zero point such that the dial settings may reflect directly the dimensions from a base line on the drawing. In establishing the line zero setting, the crank is turned an amount required by measurements taken from the work piece with respect to the boring spindle 12. The control system, when energized, will move the table an amount proportional to the rotation of the crank.

A spring loaded precision gear 37 is rotatably supported at a fixed position relative to the frame 11 and engages with the precision rack 31 at a point intermediate its ends. Rotation of the gear 37 by movement of the table drives the rotor of a precision induction resolver 38 through shaft 39. In addition, a gear 40 on the shaft 39 drives a gear 41 which is connected by a shaft 42 to the movable contact arm of a follow-up potentiometer 43 so that movement of the table will drive the contact arm a proportionate amount and change the output of the potentiometer accordingly.

In the embodiment of the invention illustrated and described herein, the precision rack and the gears driving the resolver and follow-up potentiometer are arranged so that one complete revolution of the resolver rotor occurs for each five inches of movement of the table and one complete revolution of the potentiometer contact arm takes place for the full movement of the table which is eighty inches in this case. It will be noted that a scale factor of one volt per inch of table movement will be employed in the control system. However, such values are merely illustrative and may be varied as desired.

The precision resolver and the follow-up potentiometer provide two means which cooperate in electrically sensing the distance the table is moved from a zero point. Since the resolver generates a similar range of voltages during each revolution, the potentiometer is employed to sense the position of the table and to control movement of the table to a point where the table is within a distance from the demanded position corresponding to the output for one-half a revolution of the resolver. At this point, the resolver takes over the sensing and controls the final positioning of the table. In the present case, the control changes from the potentiometer to the resolver when the table is approximately one inch from its demanded position.

In general, the follow-up potentiometer output controls movement of the table by the main drive 17 and the dog clutches 18 or 20, and the resolver output controls movement of the table through the servo motor 30 and the friction clutch 25. For convenience, these controls and the corresponding table movement may be referred to as the "coarse" control or movement and the "fine" control or movement, respectively.

Coarse control

Referring now to Fig. 2, the output from the follow-up potentiometer 43 is fed through lead 44 to a coarse voltage comparison device 45 where it is compared with a linear output or reference voltage corresponding to the number of inches in tens and units that the table is to be moved. For example, if the table is to be moved 17.715 inches, the linear output voltage would be 17 volts (where one volt is equal to one inch of table movement). The linear output voltage which is obtained by appropriate settings of the controls for an input circuit, indicated generally at 46, is fed through lead 47 to the coarse voltage comparison circuit 45. A coarse zero base correction circuit 48 may also be provided and in such event, the output of this circuit is fed to the coarse voltage comparison device through lead 48'.

The linear output voltage and the output voltage from the coarse zero base setting circuit is one hundred and eighty degrees out of phase with the output of the follow-up potentiometer. In the coarse comparison circuit, the linear output voltage is compared with the output of the follow-up potentiometer plus the output, if any, from the coarse zero base setting circuit 48 and the output of the coarse voltage comparison circuit will represent the difference between the linear output voltage and the combined outputs of the follow-up potentiometer and the coarse zero base setting circuit. The output of the coarse comparison circuit is fed through lead 49 to a voltage sensitive cut-over network 50 and so long as the output of the comparison circuit remains above the threshold value of the cut-over network, the cut-over network connects the output of the coarse voltage comparison device to a coarse phase sensitive demodulator circuit 51 through leads 52 and 52'.

The output of the phase sensitive demodulator circuit 51 is fed through lead 53 to a clutch control circuit 54 which operates the dog clutches 18 and 20 to move the table in the required direction. As previously mentioned, the phase of the output voltage from the follow-up potentiometer is reversed from the phase of the linear output voltage and the output voltage from the zero base setting circuit, and the phase difference between the compared voltages as established by the phase sensitive demodulator determines which of the dog clutches will be operated to move the table in an appropriate direction.

When the output of the coarse voltage comparison circuit drops below the threshold value of the cut-over network, the cut-over network operates to interrupt the circuit to the coarse voltage comparison circuit and the fine position control circuits then come into operation.

Fine control

The final positioning of the table is controlled by the resolver 38 which provides a means for accurately generating voltages corresponding to the distance the table is to be moved.

As is customary, the resolver has two rotor windings 38a and 38d and two stator windings 38b and 38c. The resolver is connected so that the rotor winding 38a will act as a nulling winding, as will be explained hereinafter.

In the present embodiment, the resolver makes one revolution for each five inches of table movement and circuits are provided to establish nulling points for the rotor winding at each 7.2° of rotation which correspond to tenths of an inch of table movement. The displacement of the rotor winding from a nulling point will produce an output voltage which is proportional to table movement in hundredths and thousandths of an inch.

The output of the resolver nulling winding 38a is connected through an R-C network and over lead 55 to one side of the primary winding of a comparison transformer 56, and the interpolation output voltage obtained from the input circuit 46 and the correction voltages from 76 and 79 are connected to the other side of the primary winding.

The stator windings 38b and 38c of the resolver are energized through leads 58 and 59, respectively, from tapped secondary windings of a sinusoidal transformer 60. Since the resolver rotor rotates through 360° for each five inches of table movement, the taps on the transformer are arranged so that the voltages applied to the stator windings 38b and 38c are equal to the cosine of $72x°$ and the sine of $72x°$, respectively, where $x$ is equal to the distance in inches that the table is to be moved. Thus, when the output voltage of the nulling winding 38a is equal to the interpolation voltage from the input circuit, the table will be at its demanded position.

As will be described in detail later, the connections of the resolver stator windings to the secondary windings of the sinusoidal transformer 60 are controlled through a relay matrix circuit 61 which is connected to the transformer control circuit by lead 62. The relay matrix control circuit is in turn energized from the settings of the input circuit through lead 63.

An A.C. reference voltage is applied to the primary of the sinusoidal transformer 60 through lead 64 and is also applied to a monitor bridge circuit 65 through lead 66. The monitor bridge circuit, which may be a vacuum tube voltmeter or other suitable voltage indicating device, is connected to the other rotor winding 38d of the resolver through an R-C network and lead 67 and provides a means for checking the operation of the resolver. For example, when the resolver is operating properly, the output from the rotor winding 38d should be at a maximum when the table is at the demanded position and the indicating needle of the monitor bridge circuit should indicate zero.

As stated above, the output of the nulling winding 38a of the precision resolver and the interpolation voltage are applied to the primary of the comparison transformer 56. The secondary of the transformer 56 is connected by a lead 68 to the cut-over network 50 and when the output of the coarse voltage comparison device drops below the predetermined voltage, as mentioned above, the output from the comparison transformer is then fed through the cut-over network and lead 52 to a fine phase sensitive demodulator circuit 69, to the power servo 30, and to a relay amplifier 70 through leads 71 and 72. The output of the relay amplifier is fed through lead 73 to a control circuit 74 which controls the application of power from a source to the power servo 30 and the magnetic friction clutch 25. So long as the dog-type clutches are in operation, the friction clutch is disengaged. However, when the dog-type clutches drop out, the friction clutch is energized. This prevails until the table reaches its final demanded position when the output from the resolver winding 38a and the interpolation voltage will be equal and the output of the comparison transformer will be zero. Under these conditions, the control circuit then releases all of the clutches.

Correction voltages

In order to obtain a high degree of accuracy in the final positioning of the table, say to within two ten-thousandths of an inch, any inaccuracies that may exist in the precision resolver and in the precision rack may be taken into account along with the fine zero base setting adjustment.

As previously mentioned, the fine zero base setting adjustment voltage is obtained from the setting of the potentiometer 36 by means of the crank 32 on the precision rack. The output of the potentiometer 36 is fed through lead 75 to a precision rack correction circuit 76. The precision rack correction circuit is connected to the output of the follow-up potentiometer 43 by leads 77 and 44 and generates voltages corresponding to inaccuracies in the rack at various positions of the table, as will be explained hereinafter. The output of the precision rack compensating circuit 76 and the output of the resolver correction circuit 79 is connected to the input circuit 46 by lead 78.

Correction voltages for the resolver are obtained from a resolver correction matrix circuit 79 which is connected to the relay matrix 61 by lead 80, and the output of the resolver correction matrix circuit is combined with the rack correction output through lead 81, and the combined correction output is fed through the common lead 78 to the input circuit. In the input circuit, the correction voltages are included with the voltage resulting from the settings of the input circuit controls and are thus taken into account in the interpolation output voltage which is applied to one side of the primary of the comparison transformer.

As will be explained later, the correction voltages for the precision rack and the resolver are obtained by setting the table at various positions and determining the adjustments necessary to make the interpolation output voltage equal to the resolver output at such table positions. Once the resolver matrix circuit and the precision rack correction circuits have been adjusted in accordance with such determinations, such adjustments generally will not have to be repeated.

Operation in general

In general, the operations carried out by the system shown in Figs. 1 and 2, are as follows: The machine operator must first properly mount the work piece to be machined upon the movable work table 10 with respect to spindle 12. This mounting procedure is accomplished with the aid of the blueprint or drawing showing the dimension of the piece to be machined. A reference position or bench mark, corresponding to the position from which the dimensions on the drawing are to be taken, is selected and marked upon the work piece. Then, the work piece is located on the table so that the selected reference position coincides as closely as possible to the cutting tool carried by spindle 12. After the work piece has been firmly secured to the table, the operator by turning crank 32 precisely aligns the selected reference position with respect to the cutting tool. Then, the machine operator sets the input circuit controls to the appropriate dimensions taken from a blueprint that will be required to bring the work table and the work piece carried thereon into position for the machining operations to be performed. Thereafter, movement of the work table and the work piece to the desired position is automatically controlled.

In the initial or coarse movement of the table, the output of the follow-up potentiometer is compared with a voltage obtained from the setting of the input circuit corresponding to the distance that the table is to be moved to a point where more accurate controls take over for moving the table to its final position. When the table reaches such a point, control of the table movement is automatically shifted to the precision resolver and the portions of the input circuit associated therewith.

The settings of the input circuit cause the resolver to be energized in such a way that the resolver will have a nulling point when the table has reached a position that is, for example, within approximately one-tenth of an inch from its final position. The output from the resolver as it is moved from the nulling point by further movement of the table is then employed to control the final positioning of the table.

Such an arrangement permits the table to be moved rapidly over a comparatively large distance through the main drive motor of the machine and to be brought to its final position with a high degree of accuracy by means of the precision controls including the resolver and the servo motor.

The input control circuit

Referring to Fig. 4, there is a panel 82 on which a series of switch controlling dials are mounted for operation by the machine operator in setting into the control system the distance which the table is to be moved in order to position the work piece at a desired position. As will be explained in reference to Fig. 5, the dials control switches or other control devices in the input circuit. The first dial 83a controls the setting for tens of inches, the second dial 84a controls the setting for units of inches, the third dial 85a controls the setting for tenths of an inch, the fourth dial 86a controls the setting for hundredths of an inch, and the fifth dial 87a controls the setting for thousandths of an inch.

Numerals or other indicating means associated with each of the dials are visible through opening 88 in the panel and provide readily available information to the operator as to the settings of the input circuit. A number of stations for different input circuit control settings may be provided so that a number of movements of the table to different positions may be set up in advance for a series of operations of the machine tool without stopping the machine to make such settings. A master station selector dial 89 is provided on the panel 82 and in the particular embodiment controls a switching arrangement which is adapted to shift the input circuit settings to five different stations which are identified by the letters A, B, C, D, and E. Since the input circuit is similarly arranged for each station, it will not be necessary to describe the input circuit except for one station.

If desired, the input circuit settings may be obtained by other suitable switching means such as punch cards and wiping contacts in place of the dials and switches described herein.

Referring now to Fig. 5, there is a selector switch 83 which is controlled by the dial 83a for the setting of tens of inches. Two selector switches 84 and 84' are controlled by the dial 84a for the setting of inches in units. Selector switch 85 is controlled by dial 85a for the setting in tenths of an inch. Selector switch 86 is controlled by dial 86a for the setting of hundredths of an inch and the movable contact of a potentiometer 87 is controlled by dial 87a for the settings in thousandths and ten-thousandths of an inch.

As mentioned above, similar setting controls are provided at other stations and the circuit connections for the respective setting controls are wired to the various stations through the leads b, c, d, and e, as indicated, and station switches 90, 91, 92, 93, 94, and 95, respectively, which are in turn controlled by the master station selector dial 89, The first selector switch 83 has a number of contact positions which are connected to taps on a secondary winding 96 of a linear reference transformer 97. The taps on the transformer secondary winding are arranged in voltage increments each of which corresponds to ten inches of movement of the table. In the particular embodiment described, the selector switch has eight contact positions and the voltage increments are ten volts each so that a voltage of from zero to seventy volts may be obtained from the secondary winding.

The second selector switch 84 has a number of contact positions which are connected to taps on another secondary winding 98 of the transformer 97. The secondary winding 98 is tapped at voltage increments corresponding to one inch of movement of the table and the selector switch has ten contact positions so that an output voltage corresponding to a table movement of from zero to nine inches of table travel may be obtained. In this particular embodiment, the voltage increments are one volt each and an output voltage of from zero to nine volts may be obtained.

The output from the first tapped secondary winding is connected through the selector switch 83 and the station switch 90 to the other secondary winding and the combined outputs from the two secondary windings are connected through the second selector switch 84 and the station switch 91 to the coarse comparison device 45 through lead 47 as described above. Accordingly, linear output voltages may be obtained depending upon the settings of the selector switches which correspond to movement of the table from zero to one inch less than the total distance the table may be moved. In this particular case, linear output voltages of from zero to seventy-nine volts in one volt steps may be obtained.

The setting of the units dial 84a also controls the setting of the third selector switch 84' which also has ten contact positions. The switch 84' is arranged so that the zero and fifth positions are connected to a lead $X_0$, the first and sixth positions are connected to a lead $X_1$, the second and seventh positions are connected to a lead $X_2$, the third and eighth positions are connected to a lead $X_3$, and the fourth and ninth positions are connected to lead $X_4$. The switch 84' is connected to the positive side of a D.C. power supply 99 through the station switch 92, and depending upon the setting of the switch a D.C. voltage is applied to one of the X leads. The X leads are connected to the relay control matrix 61 which will be described later.

The fourth selector switch 85 has ten positions through which connections may be made to leads $Y_0$, $Y_1$, $Y_2$, $Y_3$, $Y_4$, $Y_5$, $Y_6$, $Y_7$, $Y_8$, and $Y_9$. The switch 85 is connected to the negative side of the D.C. power supply 99 through a station switch 93, and depending upon the setting of the selector switch a D.C. voltage is applied to one of the Y leads. The Y leads are likewise connected to the relay matrix 61. Thus, the two selector switches 84' and 85 control the operation of the relay control matrix 61 as will be described later for the tenths of an inch movement of the table.

The interpolation output voltage for hundredths and thousandths of an inch are obtained from settings of the selector switch 86 and the potentiometer 87. The selector switch 86 has ten contact positions which are connected to taps on a voltage divider 100 to obtain voltage increments corresponding to table travel in hundredths of an inch. The voltage divider 100 is connected to a secondary winding 101 on the sinusoidal transformer 60 through variable resistors 102 and 103. The secondary winding and the voltage divider are center-tapped to insure linearity in the voltage obtained and the center contact position of the switch 86 will correspond to its zero position. Opposite phase voltage increments are supplied to the contact positions on opposite sides of the zero position.

The output from the voltage divider is connected through the selector switch 86 and station switch 94 to the leads 57 and 57' which are connected to the comparison transformer 56 as previously mentioned.

Voltages corresponding to table movement in thousandths and ten-thousandths of an inch are obtained by the setting of the potentiometer 87 which is connected across a secondary winding 104 on the sinusoidal transformer 60 through variable resistors 105 and 106. The movable contact arm of the potentiometer 87 is connected through station switch 95 to the center tap of secondary winding 101. The leads 57 and 57' couple the voltage selected by switch 86 and potentiometer 87 to the comparison transformer 56. The potentiometer 87 is arranged to provide an output voltage whose magnitude represents a linear travel from $-.0002$ to $+.0102$ inch in smooth variations. The overtravel of .0002 inch at either end of the potentiometer's range permits correction of small errors to be made if such errors occur at an even number of hundredths of an inch without the resetting of other selector switches.

As shown in Fig. 6, the leads $X_0$—$X_4$ and $Y_0$—$Y_9$ are connected in circuits with the coils of fifty relays $R_0$ through $R_{49}$ in the relay matrix control circuit. The relay coils are connected in columns of ten to the respective X leads and in rows of five to the respective Y-leads which are connected to the D.C. power supply 99 by the selector switches 84' and 85 as mentioned above. Since the settings or switch position of switch 84' repeat for each five inches of table travel, one-hundred discrete increments of table travel, representing a total travel of ten inches, may be selected by the switches 84' and 85 by using only fifty relays instead of one hundred.

A cold cathode gas discharge tube 107, such as a neon bulb, is connected in series with each of relay coils to prevent more than one relay coil from being energized through a sneak circuit set up in the matrix.

When one relay coil is energized through the neon bulb or cold cathode discharge tube in series therewith, the voltage input to the matrix is reduced by the resistance drop of the relay coil plus the arc drop of one discharge tube. The sneak circuit has five sets of relay coils and discharge tubes in series parallel with one other relay and discharge tube combination. Thus, any current in the sneak circuit must pass through two relay coils and two discharge tubes and by holding the voltage input to the matrix to a value only slightly greater than the arc drop of one discharge tube, no other discharge tube can operate to energize another relay.

As shown in Fig. 5, a series condenser 108 and resistor 109 are connected across the D.C. power supply 99 to insure that a previously operated relay will be deenergized when the position of the selector switches 84' or 85 is changed. The resistance 109 is connected in series between the D.C. power supply and the relay coils to prevent the voltage at the input to the selector mechanism from increasing suddenly when the selector switches are changed. The time constant of the RC circuit is such that the relay previously operated will open before the voltage rises sufficiently to cause any other discharge tube to arc. The discharge tubes will also serve to indicate which relay is energized.

Each of the relays $R_0$ through $R_{49}$ controls three sets of contacts in a triple-pole single-throw form as shown in Figs. 7 and 7a. For example, the relay $R_{27}$ (which will be operated with the selector switches set as shown) controls the opening and closing of contacts 110 and 111 in the circuit shown in Fig. 7 and of contact 112' shown in Fig. 7a. For convenience, the relay contacts controlled by their respective relays have been identified in Figs. 7 and 7a by R' and R'', respectively.

The relay controlled contacts 110 and 111 (Fig. 7) connect the stator windings 38c and 38b of the resolver to taps on the secondary windings 113 and 114 of the sinusoidal reference transformer 60 through the leads 58 and 59, respectively. The secondary winding 113 has twenty-seven taps, the center-tap being grounded, and produces twenty-six different output voltages. The taps have been arranged so that the twenty-six output voltages vary in magnitude according to the cosine of an angle from zero to one-hundred eighty degrees in 7.2° steps. The secondary winding 114 has twenty-five taps, the center-tap being grounded, and produces twenty-five different output voltages including zero volts. The taps have been arranged so that the twenty-five output voltages vary in magnitude according to the sine of an angle from zero to one-hundred eighty degrees in 7.2° steps. Compensating resistors 115 are connected in series with each of the taps to compensate for changes in the transformer resistance at the different taps and to provide a uniform resistance for all circuits to the resolver.

Since the precision resolver is geared to rotate once for each five inches of table travel, the 7.2° steps mentioned above correspond to 1/50 of a revolution which is equivalent to 1/10 of an inch of table movement.

The resolver stator windings are thus energized with voltages that are proportional to the sine and cosine of the desired angle of rotation in 7.2° steps. Assuming that the secondary windings have an output voltage ranging from minus twenty to plus twenty volts, then for zero angle of the resolver the voltage supplied to the stator winding 38c from the secondary winding of the transformer will be twenty volts and the voltage supplied to the stator winding 38b will be zero volts. For an angle of 14.4°, the stator winding 38c will be energized with a voltage equal to twenty times the cosine of 14.4° and the other stator winding 38b will be energized with a voltage equal to twenty times the sine of 14.4°. The output of the nulling winding 38a of resolver 38 should be zero when the resolver rotor is turned to an angular position of 14.4° from its zero angular position.

Resolver correction

To correct for cyclical errors associated with the rotation of the resolver rotor such as tooth-spacing error in the gear which turns the resolver and functional error in the resolver itself, a correction voltage is obtained from the resolver correction matrix circuit 79 by operation of one of the relays $R_0$ through $R_{49}$. As shown in Fig. 7a, the resolver correction matrix circuit includes a bank of fifty center-tapped potentiometers 116 each of which is connected to a center-tapped secondary winding 117 on the transformer 60 through leads 117a, 117b, and 117c. The relay controlled contacts 112 are connected in series between the contact arms of the potentiometers and the lead 81 in each case. Each of the potentiometers 116 is set maually to adjust the fifty nulling positions of the resolver in the 7.2° steps to provide the resolver correction voltage required to overcome any deviation of the output of the nulling winding from zero at such positions. The operation of the contacts 112 by the relays $R_0$ to $R_{49}$ closes a circuit to the appropriate potentiometer 116 corresponding to the position to which the resolver will be rotated. Thus, the resolver is corrected at each of its 7.2° positions throughout one complete revolution.

For positions of the resolver between the 7.2° steps (which correspond to tenths of an inch of table travel), interpolation voltages obtained from the settings of selector switch 86 and the potentiometer 87 are coupled over leads 57 and 57′ to the comparison transformer, as previously explained. The interpolation voltage, which determines the position of the table in hundredths and thousandths of an inch, varies in magnitude linearly as a function of angular position over ±3.6°. Since the sine of angles from zero to 3.6° are extremely linear, negligible error is introduced by linear interpolation over this angular range. It is also possible to provide correction voltages added in series with this rotor output so long as the total interpolation angle required remains small.

The output voltage from rotor winding 38d provides a means for monitoring the resolver positioning system since it has a predetermined maximum value when the resolver is correctly positioned. This output voltage is compared with a reference voltage in the monitor circuit 65. If, for example, the two voltages applied to the resolver stator windings 38c and 38d were incorrect in magnitude though correct in ratio, the interpolation would be in error. For this example, the output voltage from winding 38d would no longer be equal to its predetermined value and the monitor circuit would indicate the presence of an error.

Precision rack correction

As mentioned previously, correction voltages for inaccuracies in the precision rack and gears driving the resolver are obtained from the correction circuit 76.

For this purpose, inputs from the follow-up potentiometer 43 and the zero-setting potentiometer 36 are fed through leads 77 and 75, respectively to a servo amplifier 120, as shown in Fig. 8. The servo amplifier is connected to and controls the operation of a servo motor 121 in the usual manner. The servo motor drives the movable contact of a functional potentiometer 122 in accordance with the input from follow-up potentiometer 43 which will vary as the table is moved to different positions plus the input from the zero-setting potentiometer 36 as set by the fine zeroing adjustment. The functional potentiometer 122 has tapped connections which are connected to a transformer 123 through a series of correction potentiometers 124a—124h which are connected in parallel. The correction potentiometers are set manually so that the output from the functional potentiometer at various check positions of the table 10 will compensate for any difference that may exist between the output of the follow-up potentiometer and the voltage corresponding to the distance the table is moved to the respective check positions. This is accomplished by accurately positioning the table at the various check positions by a distance measuring device and then manually adjusting the corresponding correction potentiometer for each such check position to obtain the correction voltage required.

The rack correction voltages thus obtained will ordinarily be relatively small in value and may be fed together with the correction voltage from the resolver matrix to the input circuit 46 where they are combined with the interpolation output voltage and applied to the comparison transformer 56.

Operation

In the operation of the positioning appartus, with particular reference to Figs. 1 and 3 coarse voltages corresponding to coarse movement of the table are obtained from the follow-up potentiometer 43 which is connected across a portion of a secondary winding of a transformer 125. A coarse zero offset voltage which is obtained from a series of tapped connections to the remaining portion of the secondary winding of the transformer 125 may also be included with the output of the potentiometer. The taps on the transformer winding for the coarse zero offset are arranged to correspond to five inch increments of table movement which in this case are increments of five volts each and there are fifteen increments which provide a total coarse zero offset voltage of seventy-five volts. In operation, the coarse zero offset may be set to a voltage corresponding to the closest five inches that the zero or reference point on the work piece is from the cutting tool carried by spindle 12.

The linear output voltage which is obtained from settings in the input circuit and the position sensing voltage from the follow-up potentiometer and the coarse zero offset are fed through resistors 126a, 126b, and 126c, respectively, in the coarse comparison circuit to a common junction which is connected to the input of a computing or summing amplifier 127. The linear output voltage and the position sensing voltage from potentiometer 43 are reversed in phase and the difference between these voltages will appear at the output of the summing amplifier.

The output from the summing amplifier is connected to the cut-over network which includes a neon bulb 129 and an amplifier 130. When the output of the summing amplifier exceeds the threshold voltage required to maintain the neon tube in its conductive condition, the output of the summing amplifier will be connected to the amplifier 130. A neutralizing condenser 131 is connected across the neon bulb 129 so that when the output of the summing amplifier drops below the threshold voltage of the neon tube, the coupling (including any capacity coupling through the neon tube) of the coarse comparison voltage to the amplifier is canceled out. This condition will exist when the table has been moved to approximately one inch from its desired position.

When the neon bulb is conducting, the output from the summing amplifier is coupled through the neon bulb and the second amplifier 130 to a coarse phase sensitive demodulator 51 which converts the output of the amplifier into a positive or a negative voltage depending upon the phase (zero or 180 degrees) of the voltage applied thereto and this determines the direction in which the table is to be moved.

The output of the phase sensitive demodulator 51 is connected to a twin diode 132 which is connected in the clutch control circuit 54. The twin diode 132 has output connections (positive and negative) to relay coils 18a and 20a. When the table is more than 0.1 inch from the desired position, the coarse phase detector will have sufficient output to operate one of the relay coils 18a and 20a to control the operation of one of the magnetically operated dog-type clutches 18 and 20, which connect the main drive 17 to the feed screw 13. The coils 18a and 20a are respectively connected through adjustable voltage dividers 133 and 134 to positive and negative sides of a source of voltage. The voltage dividers set the drop-out point of the relays as the table approaches the desired position.

When one of the coils 18a or 20a is energized, relay contacts 18' or 20' in a control circuit will be closed. The closing of the relay contacts 18' or 20' energizes relay coils 18b or 20b which in turn will close relay contacts 18'' or 20''. The relay contacts 18'' or 20'' are connected to relay coils 18c and 20c, respectively, which operate the dog-type clutches 18 and 20 to a source of power S.

The relay coils 18b and 20b also control the operation of contacts 135 and 136, respectively, which are in a circuit connecting coil 25a which controls operation of the friction clutch 25 and a braking solenoid 137 to the source of power through the starting circuit. The contacts 135 and 136 are normally closed but one of these contacts will be opened by operation of one of the relays for the dog-type clutches. These contacts provide an interlock so that if either dog clutch is energized, the magnetic clutch 25 will not be energized.

When the table has moved to within ±0.1 inch of its desired position, the neon bulb 129 will have become extinguished and the precision positional control voltage from transformer 36 is coupled through resistor 138 and summing amplifier 130 to the inputs of the fine and coarse phase sensitive demodulators 69 and 51, respectively. For this condition, the precision control voltage from summing amplifier 130 will be below the threshold value necessary to close the relay contacts 18' and 20' of relays 18a and 20a, and the dog-type clutches 18 and 20 drop out of operation. The magnetic clutch 25 immediately takes over, the contacts 135 and 136 being closed, and the table 10 is thereafter moved by the servo motor 30 under the control of the output voltage from the fine phase demodulator 69.

The output control voltage from the fine demodulator 69 is coupled over lead 71 to the D.C. servo amplifier 139 which energizes the field winding of a D.C. generator 141.

The rotor of D.C. generator 141 is driven continuously by a three-phase induction motor 140. The magnitude and polarity of the output voltage from generator 141 varies according to the magnitude and polarity of the control voltage exciting its field. This output voltage from generator 141 is coupled through the relay contact 142, the relay coil 137 being energized, to the D.C. servo motor 30. The field winding of servo motor 30 is excited by a fixed direct voltage.

An output voltage from generator 141 proportional to its armature current is coupled as a feedback voltage to the input of servo amplifier 139. Tachometer 143 driven by D.C. servo motor 30 generates a velocity feedback voltage which is also fed back to the input of servo amplifier 139 in the conventional manner.

The servo motor 30 positions table 10 by driving feed screw 13 through the magnetic clutch 25. When the table has reached its desired position, the coil 25a of magnetic clutch 28 and the coil 137 controlling relay contact 142 are de-energized. The armature of servo motor 30 becomes short-circuited when coil 137 is de-energized thereby providing dynamic braking of servo motor 30.

The output of fine demodulator 69 also energizes a relay amplifier 70 for controlling relay coil 144 which in turn controls contacts 144'. When the table 10 has been correctly positioned to within ±0.0001 inch of the desired position, the voltage from relay amplifier 70 drops below the threshold value necessary to hold contacts 144' closed. When contacts 144' are open, the relay coil 145 is de-energized thereby opening contacts 145' and 145'' and removing the power S' from the servo control system. The table 10 is now correctly positioned and the cutting operation upon the work piece may begin.

Since contacts 145' and 144' are in series between the source of power S' and relay coil 145, the opening of contacts 144' causes contacts 145' and 145'' to open. Thereafter, the closing of contacts 144' does not energize the servo control system until starting switch 146 has been closed. Thus, after each cutting operation upon the work piece, new dimensions, which have been set into the positioning system by the adjustment of the dials 83—87 on the input panel, may be applied to reposition the table by advancing the master station selector dial 89 and reclosing the starting switch 146.

As many changes could be made in the above construction and many different embodiments of this invention could be made without departing from the scope thereof, it is intended that all matter in the above description or shown in the accompanying drawing shall be interpreted as illustrative and not in a limiting sense.

What is claimed is:

1. A servo control system for varying the angular position of a shaft in discrete angular steps comprising in combination, a rotatable transformer having relatively movable primary and secondary windings for varying the mutual coupling therebetween, said shaft being mechanically coupled to one of said windings, phase responsive means electrically coupled to one of said windings, said phase responsive means being adapted for receiving an applied alternating reference voltage and including means mechanically coupled to said shaft for varying the angular position thereof, an input circuit means adapted for receiving said applied alternating reference voltage, said input circuit means providing a plurality of discrete alternating output voltages, switching means coupling said input circuit means to the other of said windings of said rotatable transformer, indicator means coupled to said switching means, said switching means coupling a selected alternating voltage from said input circuit means to the other of said windings, the magnitude of said selected voltage being proportional to the angular position to which said shaft is to be rotated, said phase responsive means being responsive to the phase and magnitude of the output voltage from said one winding for varying the angular position of said shaft to a discrete angular position corresponding to the setting of said switching means as indicated by said indicator means.

2. A servo control system as defined in claim 1 wherein said rotatable transformer is a resolver having primary and secondary windings, one of said windings include first and second space-wound coils, and wherein said switching means couples first and second selected alternating voltages from said input circuit to said first and second space-wound coils.

3. A servo control system for varying the angular position of a shaft in discrete angular steps comprising in combination, a rotatable transformer having relatively movable primary and secondary windings for varying the mutual coupling therebetween, said shaft being mechanically coupled to one of said windings, phase detector means coupled to one of said windings, said phase detector means being adapted for receiving an applied alternating reference voltage, servomotor means mechanically coupled to said shaft, an input circuit means adapted for receiving said applied alternating reference voltage, said input circuit means providing a plurality of discrete alternating output voltages, switching means coupling said input circuit to the other of said windings of said rotatable transformer, indicator means coupled to said switching means, said switching means coupling a selected alternating voltage from said input circuit to the other of said windings, the magnitude of said selected voltage being proportional to the angular position to which said shaft is to be moved, said phase detector responding to the phase and magnitude of the output voltage from said one winding for producing an output error control voltage for energizing said servomotor means, said servomotor means varying the angular position of said shaft to a discrete angular position corresponding to the setting of said switching means as indicated by said indicator means.

4. A servo control system for varying the angular position of a shaft in discrete angular steps according to selected decimal inputs comprising in combination, a rotatable transformer having relatively movable primary and secondary windings for varying the mutual coupling therebetween, one of said windings including first and second independent space-wound coils angularly displaced one from the other, means mechanically coupling said shaft to one of said windings, an input circuit means adapted for receiving an applied alternating reference voltage, said input circuit means providing a first group of discrete alternating output voltages having a first sinusoidal amplitude distribution, said input circuit means further providing a second group of discrete alternating output voltages having a second sinusoidal amplitude distribution, the first sinusoidal amplitude distribution of said first group of alternating voltages being angularly displaced with respect to the second sinusoidal amplitude distribution of said second group of alternating voltages by an angle equal to the angular displacement between said first and second independent space-wound coils, switching means coupling said input circuit means to said first and second independent space-wound coils of said rotatable transformer, indicator means coupled to said switching means, said switching means coupling a selected voltage from said first group of discrete alternating output voltages to said first space-wound coil and further coupling a selected alternating voltage from said second group of discrete alternating output voltages to said second space-wound coil, the magnitude of said selected voltage coupled to said first space-wound coil being proportional to the sine of the angular position to which said shaft is to be moved, the magnitude of said selected voltage coupled to said second space-wound coil being proportional to the sine of the sum of the angular position to which said shaft is to be moved and the angle between said first and second space-wound coils, phase responsive means coupled to the other winding of said rotatable transformer, said phase responsive means including means mechanically coupled to said shaft for varying the angular position thereof, said phase responsive means being responsive to said alternating reference voltage and the induced voltage in said other winding for varying the angular position of said shaft to the discrete angular position corresponding to the setting of said switching means as indicated by said indicator means.

5. The servo control system as defined in claim 4 wherein the angular displacement between said first and second space-wound coils and the angular displacement between the first and second amplitude distributions of said first and second groups of alternating voltages is substantially 90 degrees.

6. The servo control system as defined in claim 4 wherein said phase responsive means includes a phase detector having an input coupled to one of said windings and including a servomotor means coupled between the output of said phase detector and said shaft.

7. The servo control system as defined in claim 4 further comprising interpolating means for varying the angular position of said shaft by selected amounts less than said discrete angular steps, said interpolating means including circuit means responsive to said alternating reference voltage for providing a third group of discrete alternating output voltages, further switching means coupling said circuit means to the input of said phase responsive means, said switching means selecting one of said third group of alternating output voltages whose magnitude corresponds to a selected angular position between said discrete angular steps to which said shaft is to be positioned, and means coupled to said further switching means for indicating the interpolated angular position to which said shaft is to be moved.

8. The servo control system as defined in claim 4 further comprising an angular position correction circuit for said rotatable transformer, said correction circuit including a plurality of independent voltage setting means responsive to said alternating reference voltage for producing a plurality of independently adjustable alternating output voltages, the number of voltage setting means corresponding to the number of discrete angular steps to which said shaft is to be positioned, voltage selecting means coupled to said plurality of voltage setting means for selecting a correction voltage corresponding to the selected discrete angular position to which said shaft is to be moved, means coupling said selected correction voltage to the input of said phase responsive means, and means coupled to each of said voltage setting means for adjusting the magnitude of each of said plurality of alternating output voltages to correct for angular positional errors within said rotatable transformer.

9. A servo control system for positioning a movable object in discrete increments of distance relative to a reference position comprising in combination, a resolver having a rotor winding and first and second stator windings, said rotor winding being mechanically coupled to said movable object, phase responsive means electrically coupled to said rotor winding, said phase responsive means being adapted for receiving an applied alternating reference voltage and including means mechanically coupled to said movable object for varying the position thereof, an input circuit means adapted for receiving said applied alternating reference voltage, said input circuit means providing a first group of discrete alternating output voltages having a sinusoidal amplitude distribution and further providing a second group of discrete alternating output voltages having a cosinusoidal amplitude distribution, first switching means coupled to said input circuit means for selecting one of said first group of alternating output voltages and coupling said selected voltage to said first stator winding, second switching means coupled to said input circuit means for selecting one of said second group of alternating output voltages and coupling said selected voltage to said second stator winding, indicator means coupled to said first and second switching means, said indicator means indicating the discrete increments of distance that said object is to be positioned, the magnitude of the selected alternating voltage coupled to said first stator winding being proportional to the sine of the angular position of the rotor of said resolver corresponding to the selected position to which said object is to be moved, the magnitude of the selected alternating voltage coupled to said second stator winding being proportional to the cosine of the angular position of the rotor of said resolver corresponding to the selected position to which said object is to be moved, said phase responsive means being responsive to the output voltage from said rotor winding and to said reference voltage for moving said object to said selected position corresponding to the setting of said first and second switching means as indicated by said indicator means.

10. A servo control system for varying the angular position of a shaft comprising in combination, a rotatable transformer having relatively movable primary and secondary windings for varying the mutual coupling therebetween, said shaft being mechanically coupled to one of said windings, phase responsive means electrically coupled to one of said windings, said phase responsive means being adapted for receiving an applied alternating reference voltage and including means mechanically coupled to said shaft for varying the angular position thereof, an input circuit means adapted for receiving said applied alternating reference voltage, said input circuit means providing a plurality of discrete alternating output voltages, switching means coupling said input circuit means to the other of said windings of said rotatable transformer, indicator means coupled to said switching means, said switching means coupling a selected alternating voltage from said input circuit to said other windings, the magnitude of said selected voltage being proportional to the angular position to which said shaft is to be rotated, said phase responsive means being responsive to the phase and magnitude of the output voltage from said one winding for varying the angular position of said shaft to a discrete angular position corresponding to the setting of said switching means as indicated by said indicator means, and interpolating means for varying the angular position of said shaft by selected amounts between said discrete angular steps, said interpolating means including variable voltage producing means responsive to said applied voltage, and means coupling the voltage from said variable voltage producing means to the input of said phase responsive means.

11. A servo control system for varying the angular position of a shaft in discrete angular steps comprising in combination, a rotatable transformer having relatively movable primary and secondary windings for varying the mutual coupling therebetween, said shaft being mechanically coupled to one of said windings, phase responsive means electrically coupled to one of said windings, said phase responsive means being adapted for receiving an applied alternating reference voltage and including means mechanically coupled to said shaft for varying the angular position thereof, an input circuit means adapted for receiving said applied alternating reference voltage, said input circuit means providing a plurality of discrete alternating output voltages, switching means coupling said input circuit means to the other of said windings of said rotatable transformer, indicator means coupled to said switching means, said switching means coupling a selected alternating voltage from said input circuit to the other of said windings, the magnitude of said selected voltage being proportional to the angular position to which said shaft is to be rotated, said phase responsive means being responsive to the phase and magnitude of the output voltage from said one winding for varying the angular position of said shaft to a discrete angular position corresponding to the setting of said switching means as indicated by said indicator means, and an angular position correction circuit for said rotatable transformer, said correction circuit including a plurality of voltage setting means responsive to said alternating reference voltage for producing a plurality of independently adjustable alternating correction voltages, the number of alternating correction voltages corresponding to the number of discrete angular steps to which said shaft is to be positioned, and means coupling a selected one of said correction voltages to the input circuit of said phase responsive means, said selected correction voltage causing said shaft to be positioned to the selected discrete angular position as indicated by said indicator means.

12. A servo control system for positioning a movable table in discrete increments of distance relative to a reference position comprising in combination, rack means mechanically coupled to said movable table, a rotatable transformer having relatively movable primary and secondary windings for varying the mutual coupling therebetween, shaft means mechanically coupled to one of said windings, gear means coupling said shaft means to said rack means, phase responsive means electrically coupled to one of said windings, said phase responsive means being adapted for receiving an applied alternating reference voltage and including means mechanically coupled to said table for varying the position thereof, an input circuit means adapted for receiving said applied alternating reference voltage, said input circuit means providing a plurality of discrete alternating output voltages, switching means coupling said input circuit means to the other of said windings of said rotatable transformer, indicator means coupled to said switching means, said switching means coupling a selected alternating voltage from said input circuit to said other winding, the magnitude of said selected voltage being proportional to the position to which said table is to be moved, and a rack correction circuit correcting for inaccuracies in the tooth spacing of said rack, said rack correction circuit including a variable resistor means having a resistor element with a plurality of taps thereon, said variable resistor means including a movable contact engaging said resistor element, means intercoupling said movable contact with said shaft means for varying the position of said movable contact along said resistor element in correspondence with the movement of the point of engagement of said gear means along said rack means, a plurality of independently adjustable rack correction voltages coupled respectively to the plurality of taps on said resistor element, the magnitudes of said rack correction voltages being determined according to the inaccuracies of selected positions of said table relative to said reference position due to inaccuracies in tooth spacing of said rack, said selected positions of said table relative to said reference position corresponding to selected points of engagement of said gear means along said rack means, and means coupling the correction voltage from said movable contact to the input of said phase responsive means, said phase responsive means being jointly responsive to the output voltage from said one winding of said rotatable transformer and said correction voltage for moving said table to the discrete distance corresponding to the setting of said switching means as indicated by said indicator.

13. In a servo control system, a decimal to analog translating device comprising in combination, a rotatable transformer having relatively movable primary and secondary windings, one of said windings including first and second independent space-wound coils angularly displaced one from the other by a fixed angle, circuit means responsive to an applied alternating reference voltage for producing a group of discrete alternating output voltages having a sinusoidal amplitude distribution, switching means having a plurality of contacts coupled to said circuit means, indicator means coupled to said switching means, said switching means coupling a selected first output voltage from said group of alternating output voltages to one of said space-wound coils, the magnitude of said selected first voltage being proportional to the sine of a selected angle, said switching means further coupling a selected second output voltage from said group of alternating output voltages to the other of said space-wound coils, the magnitude of said selected second voltage being proportional to the sine of the sum of said selected angle and said fixed angle, said indicator means providing an indication of said selected angle.

14. The apparatus as defined by claim 13 wherein said rotatable transformer is an electromechanical resolver, and wherein the fixed angle between said first and second space-wound coils is substantially 90 degrees.

15. A decimal to analog translating device for supplying first and second selected alternating voltages to first and second space-wound coils of a rotatable transformer, said first and second space-wound coils being angularly displaced from each other, comprising in combinaton, circuit means responsive to an applied alternating reference voltage for producing first and second groups of discrete alternating output voltages, said first group of alternating output voltages having a first sinusoidal amplitude distribution, said second group of alternating output voltages having a second sinusoidal amplitude distribution, said second amplitude distribution being angularly displaced relative to said first sinusoidal distribution by the angular displacement between said first and second space-wound coils, switching means having a plurality of contacts coupled to said circuit means, indicator means coupled to said switching means, said switching means selecting a first output voltage from said first group of alternating output voltages whose magnitude is proportional to the sine of a selected angle and selecting a second output voltage from said second group of alternating output voltages whose magnitude is proportional to the sine of the sum of the selected angle and the displacement angle between said first and second space-wound coils, said indicator means providing a decimal indication corresponding to said selected angle.

16. The decimal to analog translating device as defined by claim 15 wherein said circuit means responsive to an applied alternating refernce voltage includes a transformer having primary and secondary windings, and wherein said secondary winding has a plurality of taps.

17. In a servo control system for translating a movable table, said servo control system having a coarse positioning system for translating said table by selected units of distance relative to a fixed reference position: a fine servo positioning system for translating said table in discrete small increments of distance less than said selected units of distance comprising in combination, rack means attached to said table, a resolver having a rotor winding and first and second stator windings, shaft means mechanically coupled to said rotor winding, gear means coupling said shaft means to said rack means, phase responsive means electrically coupled to said rotor winding, said phase responsive means being adapted for receiving an applied alternating reference voltage and including means mechanically coupled to said table for translating the position thereof, an input circuit means adpted for receiving said applied alternating reference voltage, said input circuit means providing a first group of discrete alternating output voltages and a second group of discrete alternating output voltages, said first group of discrete alternating output voltages having a sinusoidal amplitude distribution, said second group of discrete alternating output voltages having a cosinusoidal amplitude distribution, switching means coupled to said input circuit means for selectively coupling one of said first group of alternating voltages to said first stator winding, said switching means selectively coupling one of said second group of alternating voltages to said second stator winding, indicator means coupled to said switching means, said indicator means indicating the discrete increments of distance that said table is to be translated, the magnitude of the selected alternating voltage coupled to said first stator winding being proportional to the sine of the angular position to which said resolver rotor is to be rotated to correspond to the selected distance that said table is to be translated, the magnitude of the selected alternating voltage coupled to said second stator winding being proportional to the cosine of said angular position, said phase responsive means being responsive to the phase and magnitude of the output voltage from said rotor winding for translating said table to the discrete position corresponding to the setting of said switching means as indicated by said indicator means.

18. The servo control system as defined in claim 17 further comprising a rack correction circuit correcting for the inaccuracies in the tooth spacing of said rack means, said rack correction circuit including a variable resistor means having a resistor element with a plurality of taps thereon, said variable resistor means including a movable contact engaging said resistor element, means intercoupling said movable contact with said shaft means for varying the position of said movable contact along said resistor element in correspondence with the movement of the point of engagement of said gear means along said rack means, a plurality of rack correction voltages coupled respectively to the plurality of taps on said resistor element, and means coupling the correction voltage from said movable contact to the input of said phase responsive means, said phase responsive means being further responsive to said correction voltage for correcting for any errors in the position of said table due to inaccuracies in said rack means.

19. A servo-control system for varying the angular position of a shaft in discrete angular steps comprising in combination, an adjustable transformer having relatively movable primary and secondary windings for varying the mutual coupling therebetween, said shaft being mechanically coupled to one of said movable windings, means adapted for receiving an applied alternating reference voltage and producing a plurality of discrete alternating output voltages, means coupling said alternating reference voltage to one of said windings, switching means coupled to said discrete voltage producing means for selecting one of said discrete alternating output voltages, means jointly responsive to said selected output voltage and the induced output voltage from the other of said windings for producing an error control voltage, phase responsive means coupled to said error voltage producing means, said phase responsive means being adapted for receiving said alternating reference voltage and including means mechanically coupled to said shaft, said phase responsive means being responsive to the phase and magnitude of said error control voltage for varying the angular position of said shaft to a discrete predetermined angular position corresponding to the setting of said switching means.

20. In a servo-control system for translating a movable table, said servo-control system having a coarse positioning system for translating said table by selected units of distance relative to a fixed position: a fine servo-positioning system for translating said table in discrete small increments of distance less than said selected units of distance comprising in combination, a rotatable transformer having relatively movable primary and secondary windings, shaft means mechanically coupling one of said windings to said movable table, means adapted for receiving an applied alternating reference voltage and producing a plurality of discrete alternating output voltages whose magnitude corresponds to the discrete small increments of distance by which said movable table is to be translated, means coupling said alternating reference voltage to one of the windings of said rotatable transformer, switching means coupled to said discrete voltage producing means for selecting one of said discrete alternating output voltages, means jointly coupled to said switching means and the other of said windings of said rotatable transformer for producing an error control voltage, phase responsive means coupled to said error voltage producing means, said phase responsive means being adapted for receiving said alternating reference voltage, and means mechanically coupling the output from said phase responsive means to said movable table, said phase responsive means being responsive to the phase and magnitude of said error control voltage for translating said movable table in discrete small increments of distance corresponding to the setting of said switching means.

21. A servo-control system for varying the angular position of a shaft comprising in combination, an adjustable transformer having relatively movable primary and secondary windings for varying the mutual coupling therebetween, means mechanically coupling one of said movable windings to said shaft, adjustable voltage divider means adapted for receiving an applied alternating voltage and producing a selected alternating output voltage, means coupling said applied alternating voltage to one of said windings, means coupled to said adjustable voltage divider means for varying the ratio of the magnitude of the selected alternating output voltage therefrom to the magnitude of the applied alternating voltage supplied to said one winding, error voltage producing means coupled to the output of said adjustable voltage divider means and to said other winding, said error voltage producing means being jointly responsive to said selected alternating output voltage and the induced output voltage from said other winding for producing an error control voltage, and phase responsive means coupled to said shaft, said phase responsive means having an input coupled to said error voltage producing means and being responsive to the phase and magnitude of said error control voltage for varying the angular position of said shaft according to the ratio of the magnitude of said selected alternating output voltage to the magnitude of the alternating voltage supplied to said one winding as determined by the setting of said adjustable voltage divider means.

References Cited in the file of this patent

UNITED STATES PATENTS 2,798,992  Adler et al. _____ July 9, 1957